United States Patent [19]
Ault et al.

[11] Patent Number: 6,011,978
[45] Date of Patent: Jan. 4, 2000

[54] AUTOMATIC SYSTEM SWITCHING IN A MULTIPLE-MODE WIRELESS COMMUNICATION DEVICE

[75] Inventors: Jan C. Ault, Santee; Robbin D. Hughes; Samir S. Soliman, both of San Diego, all of Calif.

[73] Assignee: QUALCOMM Incorporated, San Diego, Calif.

[21] Appl. No.: 08/813,499

[22] Filed: Mar. 7, 1997

[51] Int. Cl.[7] .................................................. H04Q 7/00
[52] U.S. Cl. .......................................... 455/552; 455/454
[58] Field of Search .................................... 455/426, 435, 455/454, 432, 434, 515, 552, 553; 370/331, 320

[56] References Cited

U.S. PATENT DOCUMENTS

| | | | |
|---|---|---|---|
| 5,119,397 | 6/1992 | Dahlin et al. . | |
| 5,420,911 | 5/1995 | Dahlin et al. . | |
| 5,594,718 | 1/1997 | Weaver, Jr. et al. | 370/331 |
| 5,722,070 | 2/1998 | Alford | 455/515 |
| 5,745,851 | 4/1998 | Goto | 455/553 |
| 5,754,542 | 5/1998 | Ault et al. | 455/553 |
| 5,818,833 | 10/1998 | Maruyama | 455/553 |
| 5,819,184 | 10/1998 | Cashman | 455/553 |

FOREIGN PATENT DOCUMENTS

| | | | |
|---|---|---|---|
| 9413069 | 6/1994 | WIPO | H04B 7/04 |
| 9801000 | 1/1998 | WIPO | H04Q 7/38 |

*Primary Examiner*—Reinhard J. Eisenzopf
*Assistant Examiner*—Marsha D. Banks-Harold
*Attorney, Agent, or Firm*—Russell B. Miller; Roger W. Martin; Charles D. Brown

[57] ABSTRACT

A wireless communication device which automatically and seamlessly switches to an alternate, available system when it is unable to complete a call origination attempt, without requiring the user to take any affirmative actions to select the alternate system or re-initiate a call origination. The wireless communication device decreases the percentage of call failures by providing a hold-over of pending call origination attempts until service is finally acquired. In the case of either exceeding the maximum number of access sequences (reverse link limited) or failure to acquire the forward link of the preferred communication system (forward link limited), the user is not required to re-initiate the call origination, thus turning a potential call failure into a success.

14 Claims, 2 Drawing Sheets

AUTOMATIC SYSTEM SWITCHING IN A MULTIPLE-MODE WIRELESS COMMUNICATION DEVICE

BACKGROUND OF THE INVENTION

I. Field of the Invention

The present invention relates to wireless communication systems and devices. More particularly, the present invention relates to a novel and improved method and system for rapidly and automatically switching between wireless communication systems in a multiple-mode wireless communication device.

II. Description of the Related Art

The use of code division multiple access (CDMA) modulation techniques is one of several techniques for facilitating communications in a wireless communication system in which a large number of system users are present. Other multiple access communication system techniques, such as time division multiple access (TDMA) and frequency division multiple access (FDMA) are known in the art. An example of a TDMA communication system is the pan-European Global System for Mobile Communications (GSM). An example of an analog FDMA system is the Advanced Mobile Phone System (AMPS) presently used in the U.S. for cellular communications.

However, the spread spectrum modulation technique of CDMA has significant advantages over these other techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501, issued Mar. 31, 1992, entitled "SOFT HANDOFF IN A CDMA CELLULAR TELEPHONE SYSTEM", and U.S. Pat. No. 5,109,390, issued Apr. 28, 1992, entitled "DIVERSITY RECEIVER IN A CDMA CELLULAR TELEPHONE SYSTEM", both assigned to the assignee of the present invention and incorporated by reference herein.

The deleterious effects of fading can be further controlled to a certain extent in a CDMA system by controlling transmitter power. A system for cell-site and mobile unit power control is disclosed in U.S. Pat. No. 5,056,109, issued Oct. 8, 1991, entitled "METHOD AND APPARATUS FOR CONTROLLING TRANSMISSION POWER IN A CDMA CELLULAR MOBILE TELEPHONE SYSTEM", Ser. No. 07/433,031, filed Nov. 7, 1989, also assigned to the assignee of the present invention. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

In the field of wireless communications, such as cellular, wireless local loop, and Personal Communication Services (PCS), base stations communicate with remote subscriber units such as portable radiotelephones. For simplicity, the term "mobile station" will be used herein to refer to such remote subscriber units, although it is understood that some remote subscriber units, such as wireless local loop phones, do not often move throughout the wireless environment, but rather are generally stationary.

Typically, in any geographic service area, there will be more than one wireless communication service provider. For example, in cellular systems in the United States, there are usually two service providers, one whose system is designated System "A", and another whose system is designated System "B". For the currently planned PCS services in the United States, there are many more service providers, denoted by blocks "A"–"F", covering the same geographical service area. The available frequency spectrum for each geographical service area is divided up among these wireless telecommunication service providers. Each service provider typically operates its own base stations and other network equipment.

In accordance with the various wireless communication standards, including Telecommunications Industry Association (TIA)/Electronic Industries Association (EIA) Interim Standard IS-95, entitled "Mobile Station - Base Station Compatibility Standard for Dual-Mode Wideband Spread Spectrum Cellular System", there exists dual-mode CDMA/AMPS portable radiotelephones which may communicate with either a CDMA base station or an AMPS base station. Furthermore, there are other industry standards existing or in development which provide for dual-mode operation among other modulation and multiplexing schemes such as dual-mode CDMA PCS band and AMPS, dual-mode CDMA PCS band and CDMA cellular band, dual-mode GSM and AMPS, and various other combinations of the known modulation and multiplexing schemes.

As can easily be appreciated from the number of co-located service providers and the number of communication protocols that may be used, there are a large number of possible communication systems that may be operating in a single geographic area, each with varying degrees of coverage. For example, since AMPS was the first analog FM-based cellular system to gain wide market acceptance in the United States, AMPS communications systems presently provide nearly 100% coverage for the entire populated regions of the U.S. However, as other competing communication systems such as CDMA cellular and CDMA PCS systems are being deployed, their total coverage area is rapidly expanding. Thus, it is anticipated that there will be many co-located communication systems with varying and overlapping degrees of coverage.

Due to the advantages of CDMA as outlined above, many users of dual-mode CDMA/AMPS mobile stations prefer to use CDMA service whenever it is available and use AMPS service only when CDMA service is not available. Furthermore, a particular user of a dual-mode CDMA cellular and CDMA PCS portable radiotelephone may prefer to use the PCS services over the cellular services for various reasons. For these reasons, dual-mode mobile stations designed in accordance with IS-95 generally allow the user to select a preferred mode of operation (i.e. CDMA or AMPS), and the mobile station will operate accordingly.

Other standards may allow the same userpreferences, or may "hard-code" a particular system priority.

In any event, whenever the user of a dual-mode mobile station is in a geographical area where good coverage exists for one of the non-preferred communication systems, for example AMPS, but imperfect coverage for the preferred system, for example CDMA, the user will generally wish to make a "seamless" transition between the two systems without requiring excessive attention to the portable radiotelephone.

In the art, the forward link (base station to mobile station) is generally assumed to fade together with the reverse link (mobile station to base station). However, due to the complexities of network planning, the forward and reverse links may be somewhat imbalanced. That is to say that the forward link may not be receivable by the mobile station in some localized areas where a base station should otherwise be able to receive the reverse link. This first case is generally referred to as being "forward link limited." A forward link limited condition might be caused by an obstruction or reflection in the path of the forward link that might not be as harmful to the reverse link due to the difference in frequency between the forward and reverse links. Conversely, the forward link may be strong enough that it is receivable by the mobile station in some localized areas where the base station is not able to receive the reverse link. This latter case is generally referred to as being "reverse link limited." A reverse link limited condition might also be caused by differences in propagation path, or perhaps because the service provider has increased the effective radiated power (ERP) of the base station in order to fight jamming by other nearby base stations belonging to a competing system.

To illustrate the undesirable effects of a forward link limited condition, consider the case where a dual-mode CDMA/AMPS mobile station is operating in the CDMA mode, and moves into a deep fade area for the forward link of the CDMA system, such as into a steep valley, and thereby loses the CDMA forward link (i.e. can no longer receive and demodulate the pilot signal from the base station), but a sufficient forward link signal from a nearby AMPS system is still present. In a conventional dual-mode mobile station, if the user attempts to originate a call during this deep fade, the call will be unsuccessful and a "No Service" and "Call Failed" indication will be displayed to the user while the dual-mode mobile station attempts to re-acquire service. After reacquiring service, the user of the conventional dual-mode mobile station will be required to re-initiate the call origination by redialing the number.

As to the reverse link limited condition, consider the case where the dual-mode CDMA/AMPS mobile station is operating in the CDMA mode, and moves into a deep fade area for the CDMA reverse link, such as inside a building or near the edge of a cell's coverage, and thereby is unable to transmit any messages to the CDMA base station successfully, but would be able to successfully transmit to an AMPS base station if it were operating in the AMPS mode. Further assume that the CDMA forward link is still strong enough in this case to be successfully demodulated by the dual-mode mobile station. In a conventional dual-mode mobile station, a signal strength indication such as a number of signal bars would be displayed on the mobile station's visual display because of the strength of the forward link. However, if the user attempts to originate a call during this condition, the call will be unsuccessful and a "Call Failed" indication will be displayed to the user. Thus, the user will see a satisfactory service indication on the display due to the relative strength of the forward link, but will still be unable to communicate with the CDMA base station.

In this reverse link limited situation, the dual-mode mobile station would be unable to acknowledge a page, originate a call, or even register with the CDMA base station even though a satisfactory service indication is displayed. Furthermore, in a conventional dual-mode mobile station, since the mobile station can successfully demodulate the preferred system (CDMA), it would not attempt to acquire the non-preferred system (AMPS), and thus the user would be unable to originate or receive any calls unless the user manually took action to force the phone to acquire the non-preferred system, such as by changing the mobile station to an "AMPS only" mode and then redialing the outgoing phone number. Also, the user would be unaware of the reverse link limited condition because the conventional dual-mode mobile station would indicate satisfactory service.

Thus, the conventional dual-mode mobile station under both forward link limited and reverse link limited conditions requires the user at least to take some affirmative action to redial a phone number due to a failed call attempt, and at worst requires the user to access a user-preferences menu to manually switch the mobile station to an alternate system. What is needed is a mobile station that automatically and seamlessly switches to an alternate, available system when it encounters a forward link limited condition or a reverse link limited condition, without requiring the user to take any affirmative actions to select the alternate system or re-initiate a call origination.

SUMMARY OF THE INVENTION

The present invention is a novel and improved method and system for rapidly and automatically switching between wireless communication systems in a multiple-mode wireless communication device. The wireless communication device comprises a processor for generating a first signaling message for transmission to a first communication system having a first pilot signal, and a transceiver for transmitting the first signaling message to the first communication system. In response to the first signaling message, the first communication system should generate a first acknowledgment message. The transceiver receives the first pilot signal and also should receive the first acknowledgment message from the first communication system. However, if the first acknowledgment message is not received, but the first pilot signal is being received (indicating that the wireless communication device is in a reverse link limited situation), the processor automatically generates a second signaling message for transmission to a second communication system having a second pilot signal. Thus, the wireless communication device automatically seeks to acquire the second communication system upon failure to close the reverse link with the first communication system.

In a preferred embodiment, the wireless communication device further comprises a user interface, such as a keypad and associated circuitry, for generating a first set of dialed digits, and a memory for storing the first set of dialed digits, with the first and second signaling messages both including the first set of dialed digits. For example, the first set of dialed digits may be a desired destination phone number. The destination telephone number is stored in the memory for later retrieval by the processor in order to generate the second signaling message. In such a case, the first and second signaling messages would be call origination messages, and thus the processor automatically "retries" the call origination with the second communication system by retrieving the dialed digits from memory without requiring the user to take any action.

To accomplish this, in the preferred embodiment, the processor comprises a call processing module for generating the first and second signaling messages and for generating an origination hold signal, and a user interface module for storing the first set of dialed digits in the memory and for providing the first set of dialed digits to the call processing module in response to the origination hold signal. The call processing module sets said origination hold signal to the logical value "TRUE" when said wireless communication device is acquiring the first or second communication system, and to the logical value "FALSE" when said wireless communication device has acquired said first or second communication system. Thus, when the user interface module senses the toggling of the origination hold signal from TRUE to FALSE, it re-initiates the pending call origination that was held over during the acquisition attempt.

Thus, the wireless communication device automatically and seamlessly switches to an alternate, available system when it encounters a forward link limited condition or a reverse link limited condition, without requiring the user to take any affirmative actions to select the alternate system or re-initiate a call origination.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Although the present invention as described herein will be disclosed with reference to an exemplary dual-mode CDMA/AMPS mobile station, it should be noted that the present invention is applicable to any wireless communication device that may communicate with more than one communication system, whether or not the two communication systems employ the same modulation or multiplexing protocols. For example, the present invention is applicable to any wireless communication device that is capable of "roaming" between various communication systems.

Figure 1:
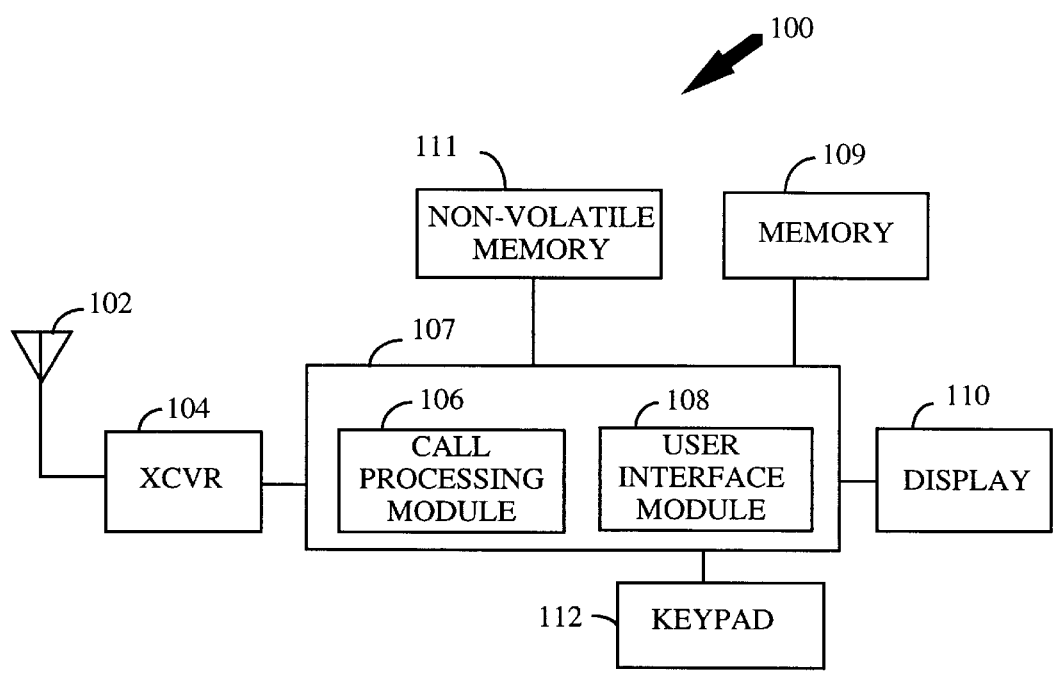
FIG. 1 is a block-diagram of selected components of an exemplary mobile station of the present invention.

Selected components of an exemplary mobile station 100 for use with the present invention are illustrated in FIG. 1. On the forward link (base station to mobile station), antenna 102 captures and routes RF energy to transceiver (XCVR) 104. XCVR 104 downconverts and demodulates the received signal and passes it to processor 107. Processor 107 receives the demodulated forward link signal from XCVR 104, and processes the signal according to conventional methods as are known in the art and described in greater detail in the above-referenced patents. With relevance to the present invention, processor 107 also performs such tasks as determining which base station of which wireless communication system to acquire in response to user preferences stored in non-volatile memory 111, acquiring the forward link of the selected base station, and generating signaling messages for transmission to the base station. Processor 107 may be a conventional microprocessor as is known in the art, programmed to perform the tasks of the present invention described herein. Although processor 107 includes many other processing modules, call processing module 106 and user interface module 108 are most relevant to the present invention and thus are illustrated in FIG. 1.

Call processing module 106 receives and processes signaling messages from the base station, and otherwise controls the actions taken by the mobile station 100 in response to signaling from the base station. For example, call processing module 106 receives and acts upon such signaling messages as registration orders, overhead information messages such as paging channel assignments, pages, and handoff direction messages.

In response to instructions from call processing module 106, user interface module 108 controls various user interfaces such as display 110 and keypad 112 which may be a conventional display and keypad as are known in the art. For example, in response to signaling from the base station indicating that mobile station 100 is out of its "home" system, and thus "roaming", user interface module 108 may enable a "roaming" indication on display 110. As a further example, in response to acquisition of the base station pilot channel, user interface module 108 may enable a service indication on display 110. User interface module 108 may control other user interfaces which, for clarity and simplicity, have not been illustrated in FIG. 1 due to their limited relevance to the present invention.

On the reverse link (mobile station to base station), the user of mobile station 100 may enter a destination telephone number via keypad 112 in order to initiate a call origination. User interface module 108 temporarily stores the dialed digits in memory 109, and unless instructed to "hold" the dialed digits as will be explained further herein, provides them to call processing module 106 which generates an origination message for transmission to the base station by XCVR 104 over antenna 102. In the present invention, call processing module 106 and user interface module 108 act in concert to implement the method of the present invention as described further herein with reference to FIG. 2. Specifically, mobile station 100 automatically and seamlessly switches to an alternate, available system when it encounters a forward link limited condition or a reverse link limited condition, without requiring the user to take any affirmative actions to select the alternate system or re-initiate a call origination.

Figure 2:
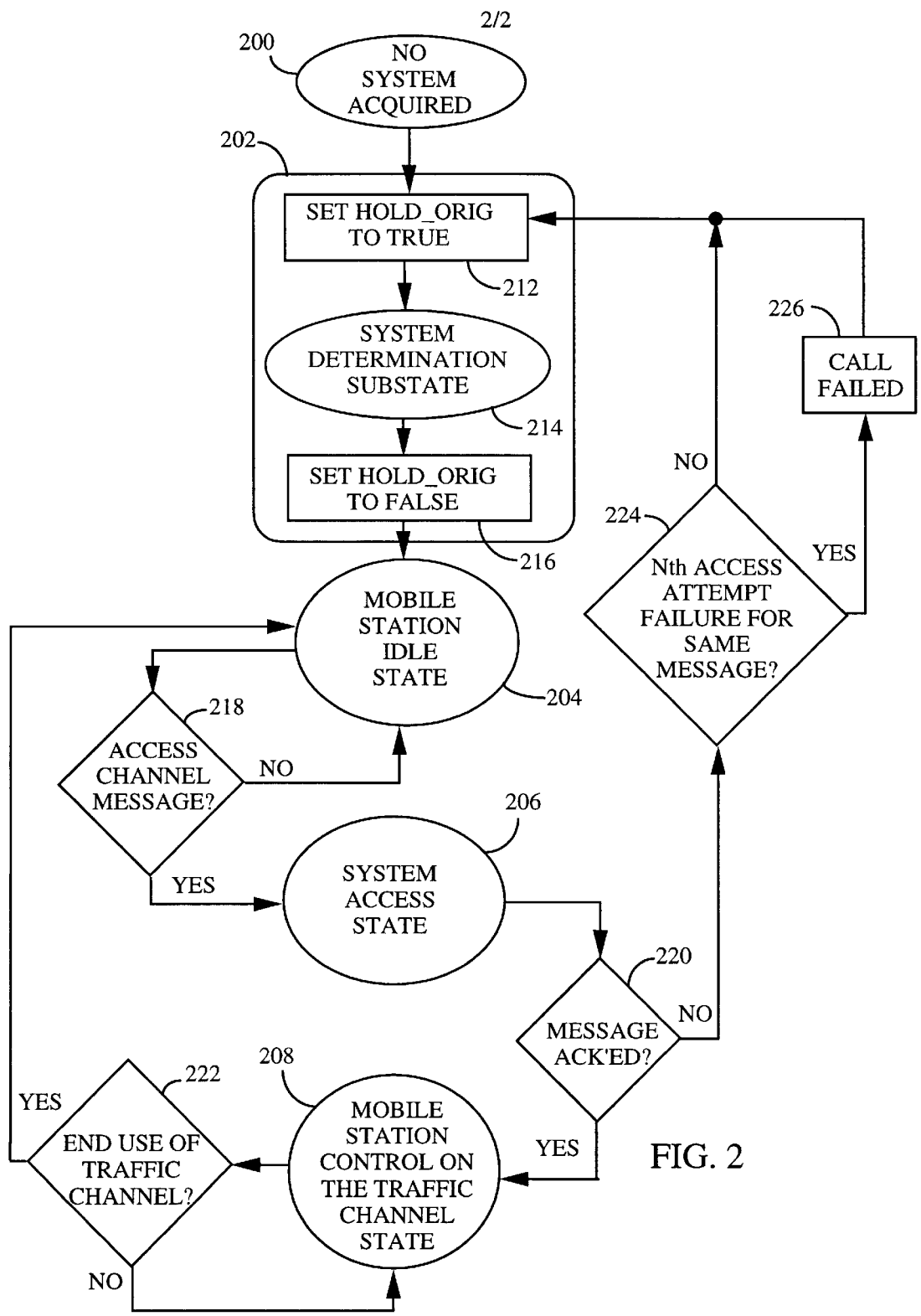
FIG. 2 is a high-level state diagram of the operation of the present invention.

A high-level state diagram of the operation of an exemplary mobile station employing the present invention is shown in FIG. 2. Although the diagram of FIG. 2 corresponds to an IS-95-compliant mobile station, its teachings are equally applicable to other wireless communication standards, whether they be cellular, mobile, PCS, or otherwise, and regardless of the modulation or multiplexing technology employed, i.e. Code Division Multiple Access (CDMA), Time Division Multiple Access (TDMA), the TDMA-based Global System for Mobile Communications (GSM), or analog Advanced Mobile Phone System (AMPS).

In FIG. 2, there are five separate major operational states illustrated: no system acquired state 200, mobile station initialization state 202, mobile station idle state 204, system access state 206, and mobile station control on the traffic channel state 208. Additionally, various relevant transitions between these major operational states are depicted. However, it should be noted that in any mobile station suitable for use with the present invention, there may be many more states and transitions which, for simplicity and clarity of disclosure, are not depicted in FIG. 2.

The mobile station begins in no system acquired state 200. No system acquired state 200 may be reached in many ways such as transition between "holes" in wireless service coverage areas, and also from any of the other states shown upon loss of the forward link. While in no system acquired state 200, display 110 of FIG. 1 may display a "NO SERVICE" indication.

To obtain service, processor 107 (FIG. 1) causes the mobile station 100 to enter mobile station initialization state 202. The mobile station initialization state 202 consists of the following four substates, but for clarity only the first is illustrated in FIG. 2:

1) System Determination Substate;
2) Pilot Channel Acquisition Substate;
3) Sync Channel Acquisition Substate; and
4) Timing Change Substate.

Upon entering the mobile station initialization state 202, call processing module 106 sets a logical flag, "HOLD_ORIG", which is short for "hold originations", to the logical value "TRUE." While the value of HOLD_ORIG is TRUE, call originations initiated by the user (for example, by dialing a phone number on keypad 112) and detected by user interface module 108 are not immediately acted upon, but rather are "held" in temporary storage in memory 109 awaiting the outcome of mobile station initialization state 202. This is in contrast to a conventional mobile station in which origination attempts that occur during mobile station initialization immediately result in a "call failed" indication because wireless service has not yet been established.

In the system determination substate 214, the mobile station 100 selects which system, and which channel of that system to use. This system determination is typically influenced by a set of preferences (i.e. "CDMA only", "AMPS only", or "CDMA then AMPS") which may be stored in nonvolatile memory 111. This system determination may be accomplished generally according to the procedures described in detail in copending U.S. Pat. No. 5,754,542 entitled, "METHOD AND APPARATUS FOR SYSTEM DETERMINATION IN A MULTI-MODE SUBSCRIBER STATION" issued on 19, 1998, and assigned to the assignee of the present invention and incorporated herein by reference. In addition, the system determination may be accomplished generally according to the procedures described in copending U.S. patent application Ser. No. 08/626,744 entitled, "METHOD AND APPARATUS FOR PERFORMING PREFERRED SYSTEM SELECTION", filed Mar. 27, 1996, assigned to the assignee of the present invention and incorporated herein by reference.

In the pilot channel acquisition substate (not shown), the mobile station 100 acquires the pilot channel of the selected system. In an IS-95-compliant system, the pilot channel is an un-modulated, direct-sequence spread spectrum signal transmitted continuously by each CDMA base station. The pilot channel allows a mobile station to acquire the timing of the forward CDMA channel, provides a phase reference for coherent demodulation, and provides a means for signal strength comparisons between base stations.

In order to acquire the pilot channel, the mobile station 100, controlled by processor 107, may execute the acquisition procedures described in detail in copending U.S. Pat. No. 5,644,591 entitled, "METHOD AND APPARATUS FOR PERFORMING SEARCH ACQUISITION IN A CDMA COMMUNICATION SYSTEM" issued Jul. 1, 1997 and assigned to the assignee of the present invention and incorporated herein by reference. Alternately, the mobile station 100 may execute other acquisition procedures which are well known in the art, depending on the type of system being acquired.

However, if the mobile station 100 is unsuccessful in acquiring the pilot channel of a preferred CDMA system when in the mobile station initialization state 202, it will re-enter the system determination substate and attempt to acquire the pilot channel of an alternate communication system, according the set of preferences stored in nonvolatile memory 111 as mentioned above. Failure to initially acquire the pilot channel may be one case of the forward link limited situation as described above.

After successful acquisition of the pilot channel, the mobile station 100 enters the sync channel acquisition substate in which it receives and processes sync channel messages. In an IS-95-compliant CDMA system, the sync channel uses the same PN sequence and phase offset as the pilot channel and can be demodulated whenever the pilot channel is being tracked. The sync channel carries, among other things, base station identification and System Time. In the timing change substate, the mobile station synchronizes its system timing to that of the base station, based on the received System Time on the sync channel.

Upon successful system acquisition and initialization, call processing module 106 would set HOLD_ORIG back to FALSE, thereby allowing any call originations already detected and stored by user interface module 108 to proceed normally. This is in contrast to a conventional mobile station in which origination attempts that occur during mobile station initialization immediately result in a "call failed" indication because wireless service has not yet been established. Thus, the dialed digits of an origination attempt that occurs during system initialization state 202 is temporarily stored in memory 109 until a system is acquired, at which point it is then forwarded to call processing module 106 for inclusion in the dialed digits portion of an origination message transmitted by XCVR 104 (FIG. 1). By temporarily storing the dialed digits in memory 109 until a system is acquired, a user of mobile station 100 would not be required to re-enter the dialed digits in keypad 112, or take any other action (such as pressing a "redial" key) in order to complete a premature call origination attempt that occurs before wireless communication has been established.

In mobile station idle state 204, the mobile station 100 monitors the paging channel. The paging channel is a forward channel used for transmission of control information and pages from a base station to a mobile station. While in mobile station idle state 204, the mobile station 100 may receive overhead messages which communicate base-station specific as well as system-wide information, receive an incoming call, initiate a call origination, initiate a registration, or initiate a message transmission.

When the mobile station 100 initiates a call origination, registration or other message transmission such as responding to an incoming page, call processing module 106 generates an access channel message for transmission to the base station. When an access channel message has been generated as illustrated by decision diamond 218, the mobile station 100 enters system access state 206 wherein it attempts to transmit one or more access channel messages on the access channel. The access channel message may be, for example, a pending call origination attempt that was held over during system initialization substate 202, or it may be a call origination attempt that was first initiated during mobile station idle state 204, or it may be an overhead message such as a registration message.

In a CDMA communication system, the access channel provides communications on the reverse link from the mobile station 100 to the base station when the mobile station 100 is not using a traffic channel. One or more access channels is paired with every paging channel. The base station responds to transmissions on a particular access channel by a message on the associated paging channel. Similarly, the mobile station 100 responds to a paging channel message by transmitting on one of the associated access channels.

If the mobile station were to experience a deep fade of the paging channel, that may be another case of the forward link limited situation described above and the mobile station would return to the system determination substate of the mobile station initialization state 202 and attempt to re-acquire service with either the same CDMA communication system or an alternate system in accordance with the set of system preferences stored in non-volatile memory 111.

In system access state 206, the mobile station 100 transmits on the access channel using a random access procedure. The entire process of sending one access channel message and receiving (or failing to receive) an acknowledgment of that access channel message is called an "access attempt." An access attempt comprises transmitting one or more "access probe sequences." Each access probe sequence comprises transmitting one or more "access probes." Each access probe comprises the access channel message and the mobile station transmits the same access channel message in each access probe in an access attempt.

Thus, within an access attempt, access probes are grouped into access probe sequences. The first access probe of each access probe sequence is transmitted at a predetermined power level. Each subsequent access probe in that access probe sequence is transmitted at a power level which is a predetermined power increment higher than the previous access probe in that access probe sequence. For example, if the predetermined power level for the first access probe is 7 dB, and the predetermined power increment is 2 dB, then the first access probe in every access probe sequence will be transmitted at 7 dB, the second access probe in every access probe sequence will be transmitted at 9 dB, the third at 11 dB, and so on until the access probe sequence is complete.

If one access probe sequence is unsuccessful in evoking an acknowledgment from the base station, another identical access probe sequence will begin. The mobile station 100 stops transmitting access probe sequences, thus ending the access attempt, when it receives an acknowledgment from the base station, or when it has transmitted a predetermined maximum number of access probe sequences. Termination of the access attempt due to reaching the predetermined number of access probe sequences would be a case of the reverse link limited situation described above. It should be noted that access attempts may be performed in other ways as are known in the art, depending on the nature of the system providing service.

If the access attempt is successful as determined at decision diamond 220, and the access channel message is an origination message indicating that the user of the mobile station is originating a call, the mobile station is directed to a traffic channel by the base station, and the mobile station enters the mobile station control on the traffic channel state 208. When the use of the traffic channel is complete, as in when the call is completed as determined in decision diamond 222, the mobile station returns to the mobile station idle state 204.

However, if the access attempt is unsuccessful because it does not evoke an acknowledgment from the base station at decision diamond 220, then the processor 107 determines, in decision diamond 224, whether this latest unsuccessful access attempt was the Nth access attempt failure for the same access channel message, where N is an integer greater than one. If it is not, then call processing module 106 again sets HOLD_ORIG to TRUE, and re-enters system determination substate 214. Instead of using a fixed number of retries as determined by decision diamond 224, it is also possible to use a timer that allows as many or as few retries as can be attempted within some time period, such as 20 seconds. In such a case, decision diamond 224 would fail a call origination attempt upon the expiration of the timer regardless of how many or few retries had been attempted. Alternately, a combination of these techniques may be used.

In system initialization state 202, the mobile station 100 preferably attempts to acquire a different communication channel or system than the one on which the access attempt most recently failed. For example, suppose there are two communication systems in the same geographical area—a CDMA PCS system and an analog AMPS system. Further suppose that the PCS CDMA system is operating on two different CDMA channels, channel number 400 and channel number 425, and the AMPS system is operating on analog channel "B". If an access attempt failure for the origination message was received while service was being provided on PCS CDMA channel number 425, then the system determination substate 214 preferably would either attempt to acquire the analog AMPS system on analog channel "B", or the PCS CDMA system on CDMA channel number 400.

If the analog AMPS channel "B" was acquired during system initialization state 202, the call processing module 106 would again set HOLD_ORIG to FALSE. In response to sensing HOLD_ORIG toggle from TRUE and back to FALSE, user interface module 108 would retrieve the dialed digits from memory 109, and re-initiate the call origination. If the call origination went through this time, meaning that the base station acknowledged the call origination at decision diamond 220, the mobile station 100 would complete the call normally on a traffic channel and return to mobile station idle state 204. Thus, the user would not be required to redial the phone number even though service had been lost on one system and then regained on another. In one embodiment, provisions are made to re-scan for service periodically on the original, preferred PCS CDMA channel number 425. For example, processor 107 may set a timer for one minute and then return to system initialization state 202 to re-acquire the preferred system upon expiration of the timer. Alternately, the one-minute timer may be reset after every origination on the analog AMPS system.

However, if the analog AMPS channel "B" was not acquired during system initialization state 214, the mobile station 100 may continue to scan for and ultimately acquire service on the alternate PCS CDMA channel number 400. Similar to the example just presented, in response to sensing HOLD_ORIG toggle from TRUE and back to FALSE, user interface module 108 would retrieve the dialed digits from memory 109, and re-initiate the call origination.

Suppose that the access attempt failed as determined at decision diamond 220 on whichever alternate system was first acquired (either the analog AMPS channel "B" or the PCS CDMA channel number 400). This would be the second failure for the same call origination attempt, i.e. for the same dialed digits once entered by the user. If N=2 in decision diamond 224, then the call origination would fail, and the user interface module 108 would indicate a call failure on display 110 at block 226. Thus, the present invention provides for N access attempts on different systems for the same call origination before requiring the user to take some action to remedy the situation (i.e. redialing the phone number, moving to an area of better coverage, etc.). The number N, and thus the number of "retries", may be fixed, or may be user configurable. For example, the manufacturer of the mobile station 100 may decide that only a single retry of the origination message as described herein would be proper and may set the value of N at two.

It should again be noted that the present invention is applicable beyond the specific CDMA and analog AMPS examples presented herein, but rather is applicable to any mobile station which may operate on more than one communication system. For example, if there are two PCS CDMA systems in a given geographical area, the present invention may be used to provide a CDMA to CDMA retry. Additionally, it should be noted that the specific user preferences stored in non-volatile memory 111, and used during system determination substate 214 to determine which systems should be acquired, are not critical to the present invention. The user preferences in non-volatile memory may be a table of preferred systems, or a ranked table of systems in order of preference, or merely a list of probable systems that may be available.

As described herein, the present invention decreases the percentage of call failures by providing a hold-over of pending call origination attempts until service is finally acquired. In the case of either exceeding the maximum number of access sequences (reverse link limited) or failure to acquire the forward link of the preferred communication system (forward link limited), the user is not required to re-initiate the call origination, thus turning a potential call failure into a success.

Furthermore, the present invention is not limited to retry of call origination attempts. The present invention may also be used to perform automatic and seamless system switching in a reverse link limited situation for a failure of any access channel message, thus allowing the mobile station 100 to quickly switch to, and register in, an alternate system when it is unable to register in the preferred system. This would avoid the undesirable affect of the mobile station 100 missing an incoming call because it was unable to register in the preferred system. Even in the case where the mobile station 100 were able to register in the preferred system before becoming reverse link limited, the automatic system switching of the present invention may be used to cause the phone to seek an alternate system for service when it is unable to receive an acknowledgment for any other overhead message transmitted on the access channel.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A wireless communication device comprising:
   a processor for generating a first signaling message for transmission to a first communication system having a first pilot signal; and
   a transceiver, coupled to said processor, for transmitting said first signaling message to said first communication system and for receiving said first pilot signal and a first acknowledgment message from said first communication system;
   wherein said processor automatically generates a second signaling message for transmission to a second communication system having a second pilot signal only if said transceiver does not receive said first acknowledgment message and does receive said first pilot signal.

2. The wireless communication device of claim 1 further comprising:
   a user interface, coupled to said processor, for generating a first set of dialed digits; and
   a memory, coupled to said processor, for storing said first set of dialed digits, said first and second signaling messages both including said first set of dialed digits.

3. The wireless communication device of claim 2 wherein said processor retrieves said first set of dialed digits from said memory in order to generate said second signaling message.

4. The wireless communication device of claim 3 wherein said first and second signaling messages are call origination messages.

5. The wireless communication device of claim 4 wherein said processor comprises:
   a call processing module for generating said first and second signaling messages and for generating an origination hold signal; and
   a user interface module for storing said first set of dialed digits in said memory and for providing said first set of dialed digits to said call processing module in response to said origination hold signal.

6. The wireless communication device of claim 5 wherein said call processing module sets said origination hold signal to a first logical value when said wireless communication device is acquiring said first or second communication system, and to a second logical value when said wireless communication device has acquired said first or second communication system.

7. The wireless communication device of claim 1 wherein said first and second signaling messages are registration messages.

8. A method for automatically switching between a first communication system having a first pilot signal and a second communication system having a second pilot signal, the method comprising the steps of:
   receiving said first pilot signal;
   generating a first signaling message for transmission to said first communication system;
   transmitting said first signaling message to said first communication system;
   automatically generating a second signaling message for transmission to said second communication system only if a first acknowledgment message from said first communication system is not received.

9. The method of claim 8 further comprising the steps of:
   generating a first set of dialed digits; and
   storing said dialed digits in a memory, said first and second signaling messages both including said first set of dialed digits.

10. The method of claim 9 wherein said step of automatically generating said second signaling message includes the step of retrieving said first set of dialed digits from said memory.

11. The method of claim 10 wherein said first and second signaling messages are call origination messages.

12. The method of claim 11 further comprising the step of generating an origination hold signal, wherein said step of retrieving said first set of dialed digits from said memory is performed in response to said origination hold signal.

13. The method of claim 12 wherein said step of generating said origination hold signal includes the steps of:
   setting said origination hold signal to a first logical value when said wireless communication device is acquiring said first or second communication system;
   setting said origination signal to a second logical value when said wireless communication device has acquired said first or second communication system.

14. The method of claim 8 wherein said first and second signaling messages are registration messages.

* * * * *